United States Patent [19]

Takashima et al.

[11] Patent Number: 5,993,874
[45] Date of Patent: Nov. 30, 1999

[54] METHOD FOR APPLYING SEASONING LIQUID TO DRIED LAVER

[75] Inventors: Shuji Takashima; Toshihiro Kawamura, both of Tokyo, Japan

[73] Assignee: Kabushiki Kaisha Yamagataya Noriten, Tokyo, Japan

[21] Appl. No.: 08/864,430

[22] Filed: May 28, 1997

[30] Foreign Application Priority Data

May 28, 1996 [JP] Japan .................................... 8-132921

[51] Int. Cl.⁶ .................................................. A23L 1/337
[52] U.S. Cl. .......................... 426/302; 426/89; 426/575; 426/615; 425/90; 425/92
[58] Field of Search ............................. 426/89, 302, 575, 426/615, 442, 506; 425/90–93

[56] References Cited

FOREIGN PATENT DOCUMENTS 54-59356  5/1979  Japan .
57-33186  2/1982  Japan .
60-149366  8/1985  Japan .
61-58559  3/1986  Japan .
62-155068  7/1987  Japan .
2-295475  12/1990  Japan .

OTHER PUBLICATIONS

Translation of Kokai Patent Application No. SHO 61–58559, 1986.
Tsuji, S., "Japanese Cooking a Simple Art", pp. 78–81.

Primary Examiner—Milton Cano
Attorney, Agent, or Firm—Foley & Lardner

[57] ABSTRACT

A method for applying seasoning liquid to dried laver, in which seasoning liquid containing solid matter. The seasoning liquid is applied on the surfaces (13) of hydrophobic rollers (12) having a rugged surface (11), and the dried laver (4) is brought into contact with the rollers (12), by which the seasoning liquid on the surfaces (13) is applied to the dried laver (4).

6 Claims, 6 Drawing Sheets

METHOD FOR APPLYING SEASONING LIQUID TO DRIED LAVER

BACKGROUND OF THE INVENTION

1. Field of the Invention

The present invention relates to a method for applying seasoning liquid to dried laver.

2. Description of the Related Art

Normally, to produce seasoned laver, a syrupy seasoning liquid called "tare" in Japanese is uniformly applied to both sides of dried laver. Basically, the seasoning liquid is applied to dried laver as follows: First, three-stage sponge rollers are arranged vertically so as to be in contact with each other. Then, when the uppermost roller is rotated while being supplied with a seasoning liquid, the second and third rollers thereunder are also rotated and the seasoning liquid is fed in sequence. When dried laver is allowed to pass between the second and third rollers, the seasoning liquid is uniformly applied to both sides of dried laver.

FIGS. 7 and 8 show a prior art laver seasoning device used currently. This device is configured by combining sponge rollers a and threads b. FIG. 7 is a side view of this device, and FIG. 8 is a front view thereof. In these figures, two rows of four-stage sponge rollers a are arranged vertically, and other rollers e are provided in front and in rear of the second and third sponge rollers c and d. These rollers e are connected to each other by threads b, which prevents dried laver f from being wounded around the sponge rollers c and d. A seasoning liquid is supplied from a faucet g above the rollers and fed to the uppermost roller h to the lower-stage rollers in sequence. By making dried laver f pass between the rollers c and d positioned second and third from above, the seasoning liquid is applied to the dried laver f.

However, the above-mentioned conventional method for applying seasoning liquid to dried laver has the following problems:

(1) When a solid matter, such as curry powder, is contained in the seasoning liquid, the solid matter sticks and accumulates on the surfaces of the sponge rollers, so that it is difficult to apply the seasoning liquid to the dried laver. For this reason, it is necessary to remove the solid matter by filtering the seasoning liquid.

(2) If the viscosity of seasoning liquid is increased or the supply amount is increased, there is a possibility of dried laver being wound around the sponge roller.

(3) The sponge roller has high water absorption properties, and the seasoning liquid soaks into the sponge roller well, so that it is difficult to clean the interior of sponge roller. Therefore, microorganisms such as mold breed, which is bad for health.

(4) If a strong seasoning liquid is applied to the whole surfaces of dried laver, the taste sometimes becomes strong.

The present invention was made in view of the above situation, and accordingly an object thereof is to provide a method for applying seasoning liquid to seasoned laver, in which seasoning liquid containing a solid matter can be applied, dried laver is not wound around a roller, and which is good for health and provides proper taste.

SUMMARY OF THE INVENTION

The present invention was made to achieve the above object, and the gist thereof is as follows: A seasoning liquid is applied on a convex or concave surface of a hydrophobic roller having a rugged surface, and dried laver is brought into contact with the roller, by which the seasoning liquid applied on the convex or concave surface is applied to the dried laver. Also, a seasoning liquid is applied on a roller having linear objects wound around the surface thereof, and dried laver is brought into contact with the roller, by which the seasoning liquid applied on the linear objects is applied to the dried laver.

The method for applying seasoning liquid to seasoned laver in accordance with the present invention will be described in detail with reference to the accompanying drawings.

FIG. 1 is a schematic side view of a device for applying seasoning liquid to dried laver in accordance with the present invention. In this device, four-stage rollers 1 are arranged vertically. A roller 2 positioned third from above is a driving roller. When this roller 2 is rotated, other rollers are rotated at the same time. Then, when a seasoning liquid is supplied from above, the seasoning liquid is fed from an uppermost roller 3 to lower rollers in sequence. When dried laver 4 is inserted between the third roller 2 and a lowermost roller 5 and fed intermittently, the seasoning liquid is applied to the dried laver 4. The seasoning liquid can contain the powder of curry, miso, sea urchin, ume, etc.

FIG. 2 is a schematic side view of another device for applying seasoning liquid to dried laver in accordance with the present invention, like FIG. 1. For this device, the seasoning liquid 6 is supplied form below. Specifically, a vessel 8 containing the seasoning liquid 6 is placed under a lowermost roller 7, and the lowermost roller 7 is rotated to stick the seasoning liquid 6 on the roller 7 so that the seasoning liquid 6 is fed to upper rollers in sequence.

The third roller 2 and the lowermost roller 5 shown in FIG. 1 or an uppermost roller 9 and a second roller 10 shown in FIG. 2 have a surface of a rugged shape, or linear objects are wound around these rollers so that the seasoning liquid sticking to the rugged shape or linear objects is applied to the dried laver 6. Preferably, braided nylon threads with a diameter of 2.5 to 4.0 mm should be used as the linear objects.

FIGS. 3 and 4 are enlarged side views of a seasoning portion of the aforesaid rollers. FIG. 3 shows a method in which the seasoning liquid 6 is applied on a convex surface 13 of respective rollers 12 having a rugged surface 11, and the convex surface 13 is brought into contact with the dried laver 4 to apply the seasoning liquid to the dried laver 4. These rollers 12 should preferably be formed of a material that does not absorb or adsorb the seasoning liquid 6 and solid matters contained in the seasoning liquid. For example, rubber, nylon, or polyethylene is preferable. If the concave surface 14 is too shallow, or the supply amount of the seasoning liquid 6 is too large, the concave surface 14 is filled with the seasoning liquid 6. It is therefore necessary to properly provide the depth of the concave surface 14 and the supply amount of the seasoning liquid 6.

FIG. 4 shows a method in which a rugged surface 11 is provided on the roller surface like the method shown in FIG. 3 but the seasoning liquid 6 is applied on the concave surface 15 to be applied to the dried laver 4 by bringing the concave surface into contact with the dried laver 4. In this case, rollers 16 are rotated with a blade 18 being in contact with a convex surface 17 to scrape off the seasoning liquid 6 sticking to the convex surface 17 of the respective rollers 16.

DETAILED DESCRIPTION OF PREFERRED EMBODIMENTS

Working examples are shown below.

WORKING EXAMPLE 1

Figure 1:
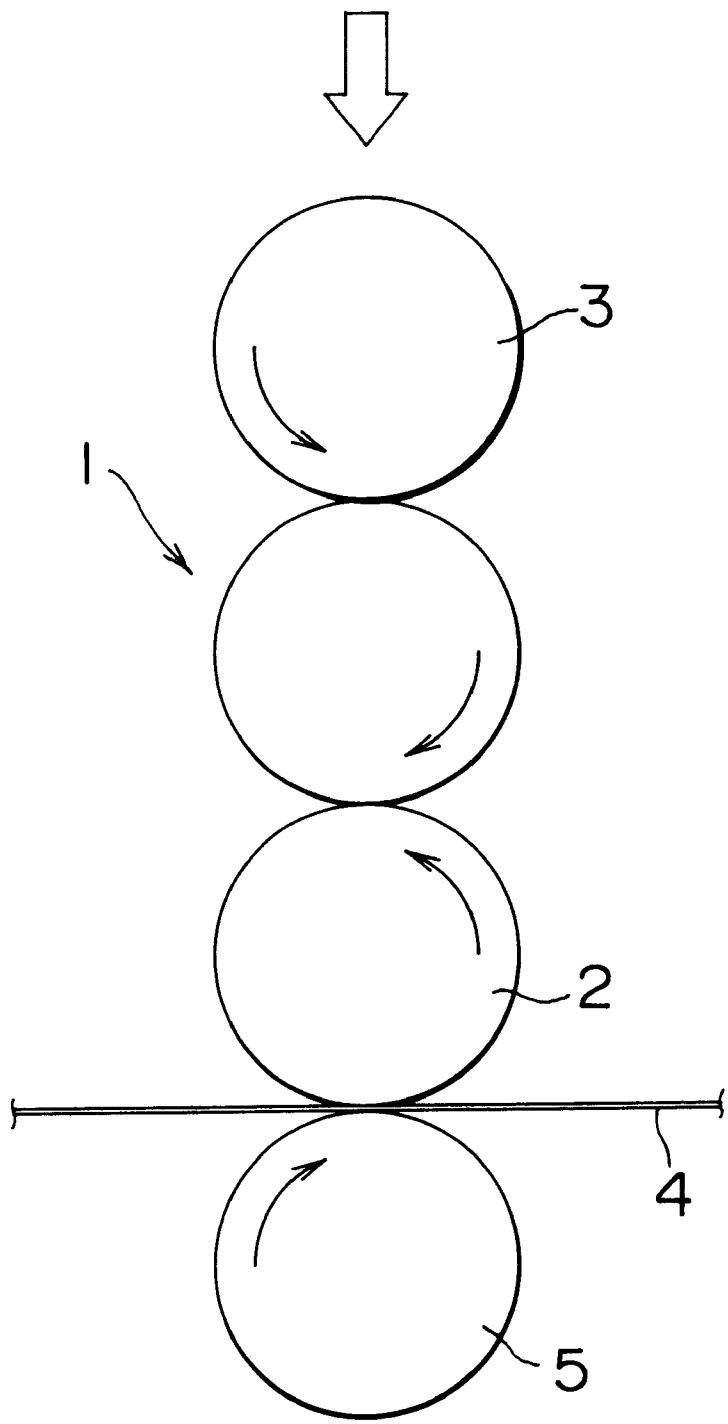
FIG. 1 is a schematic side view of a device for applying seasoning liquid to dried laver in accordance with the present invention (the case where seasoning liquid is supplied from above)
Figure 2:
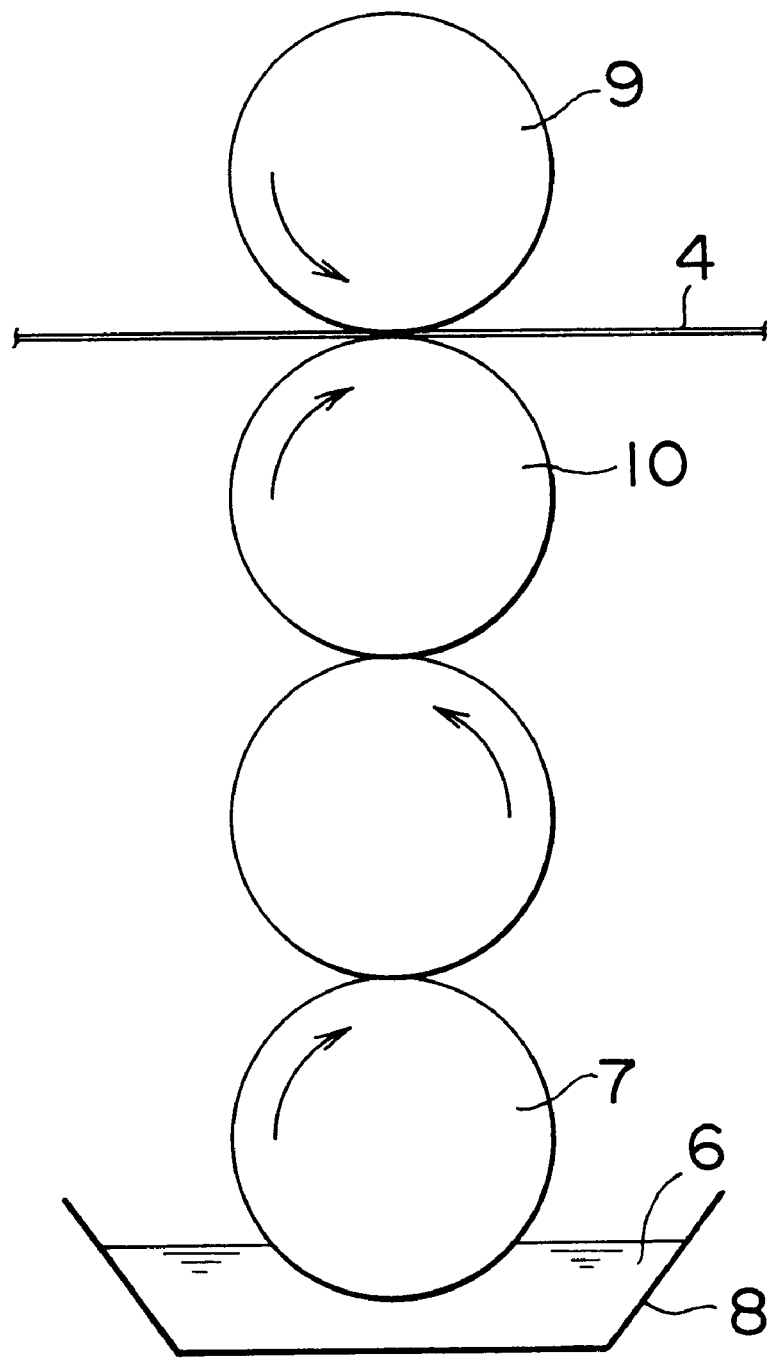
FIG. 2 is a schematic side view of a device for applying seasoning liquid to dried laver in accordance with the present invention (the case where seasoning liquid is supplied from below)
Figure 3:
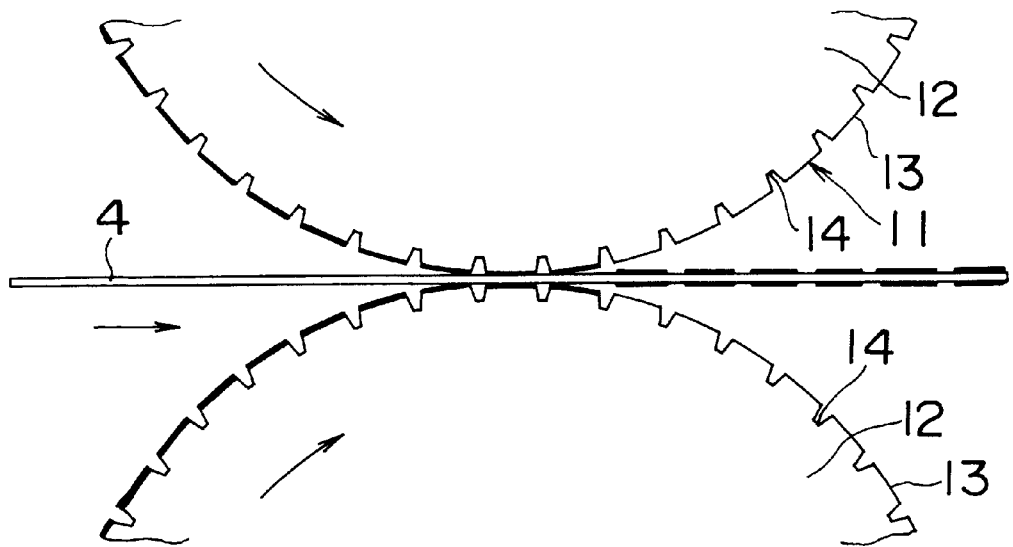
FIG. 3 is an enlarged side view of rollers in accordance with the present invention (the case where seasoning liquid is applied with the convex surface of roller)
Figure 4:
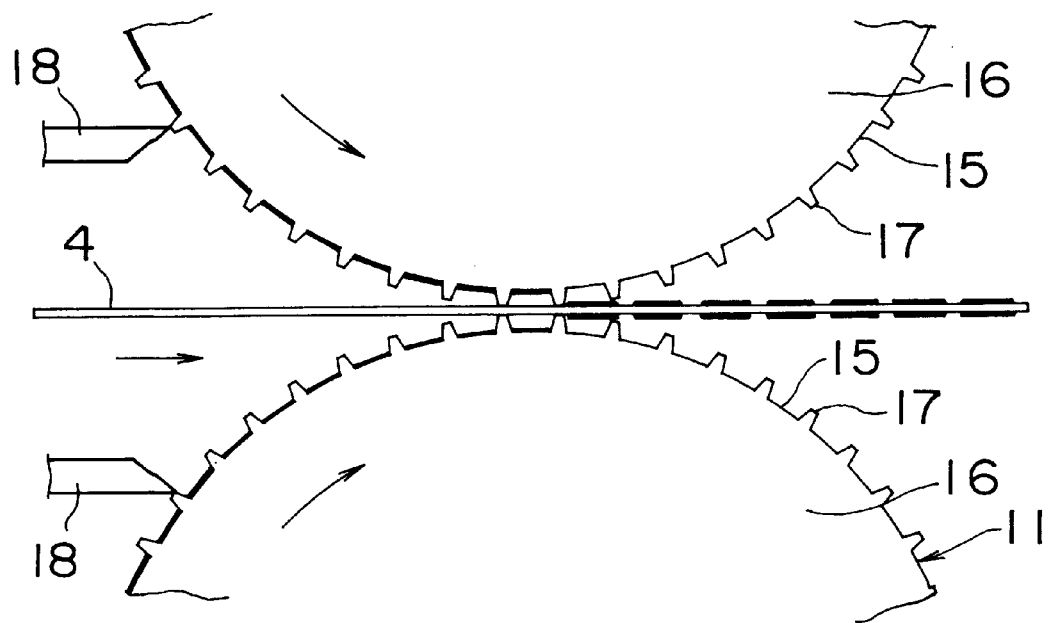
FIG. 4 is an enlarged side view of rollers in accordance with the present invention (the case where seasoning liquid is applied with the concave surface of roller)

As working example 1, an experiment was made by using a device of the type shown in FIG. 2. Four rollers with a diameter of 9 cm and a length of 27 cm were arranged vertically, and a roller positioned third from above was used as a driving roller. When this driving roller was rotated, other rollers were rotated together. A rubber sheet having cylindrical protrusions with a diameter of 2 mm and a height of 1 mm was wound around each of upper two rollers. A rubber sheet having a flat surface was wound around each of lower two rollers. The gap between the rollers was set to 0.15 mm. A part of a lowermost roller 7 was immersed in a seasoning liquid 6 so that the seasoning liquid 6 was fed to the upper rollers in sequence. The seasoning liquid 6 of Brix 56 (viscosity: 23 cp, containing powder) was used. Incidentally, Brix means the concentration of soluble solid matter. By using this device, dried laver 4 was inserted between the uppermost roller 9 and the second roller 10 one by one and 100 sheets of dried laver 4 were fed, with the result that solid matters contained in the seasoning liquid 6 as well as the seasoning liquid 6 were satisfactorily applied to the dried laver 4.

WORKING EXAMPLE 2

Like working example 1, an experiment of working example 2 was made by using the device shown in FIG. 2. Rollers with a diameter of 9 cm and a length of 27 cm were used, and the surface thereof was provided with cylindrical protrusions with a diameter of 2 mm and a height of 1 mm uniformly at intervals of 0.5 mm. The seasoning liquid 6 of Brix 56 (viscosity: 40 cp, soy sauce taste) was used. By using this device, dried laver 4 was inserted between the rollers and fed, with the result that circular patterns with a diameter of 2 mm were put on the dried laver 4, and proper taste was provided.

WORKING EXAMPLE 3

Next, an experiment of working example 3 was made by using the device shown in FIG. 2. Rollers with a diameter of 9 cm and a length of 27 cm were used. Many braided nylon threads with a diameter of 3 mm were wound adjacently around the uppermost roller 9 and the second roller 10. The gap between the two lower rollers was set to 0.2 mm. The seasoning liquid 6 of Brix 58 (viscosity: 200 cp) was used. In this case as well, a total of 500 sheets of dried laver 4 were fed, with the result that the dried laver 4 was not wound, and the seasoned laver of good taste was produced.

Other Embodiments

Figure 5:
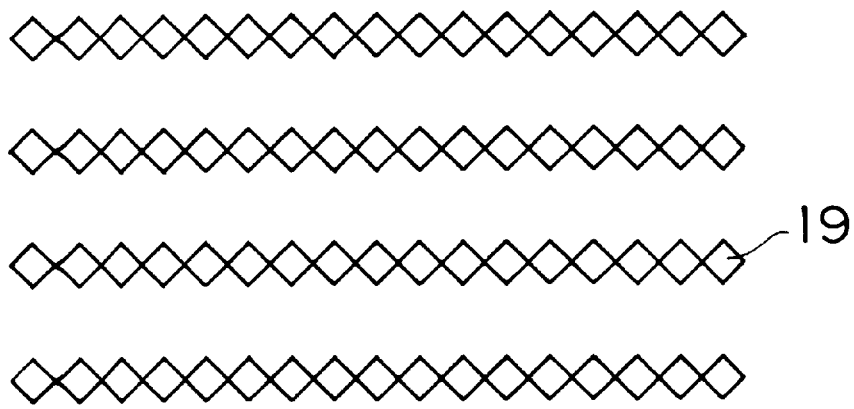
FIG. 5 is a view showing another embodiment of rugged shape of the roller surface.
Figure 6:
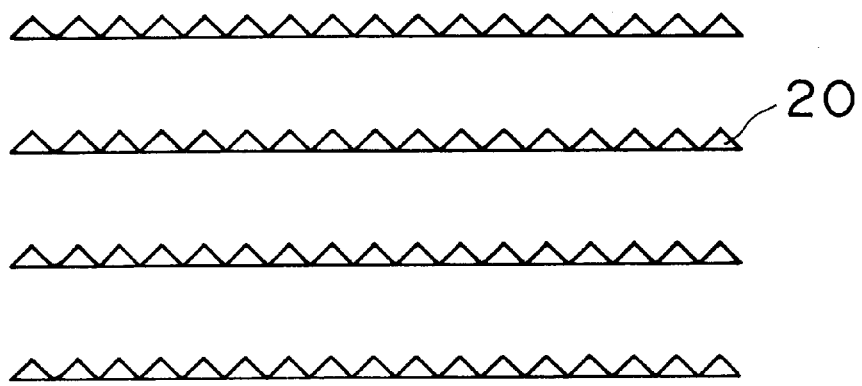
FIG. 6 is a view showing still another embodiment of rugged shape of the roller surface.
Figure 7:
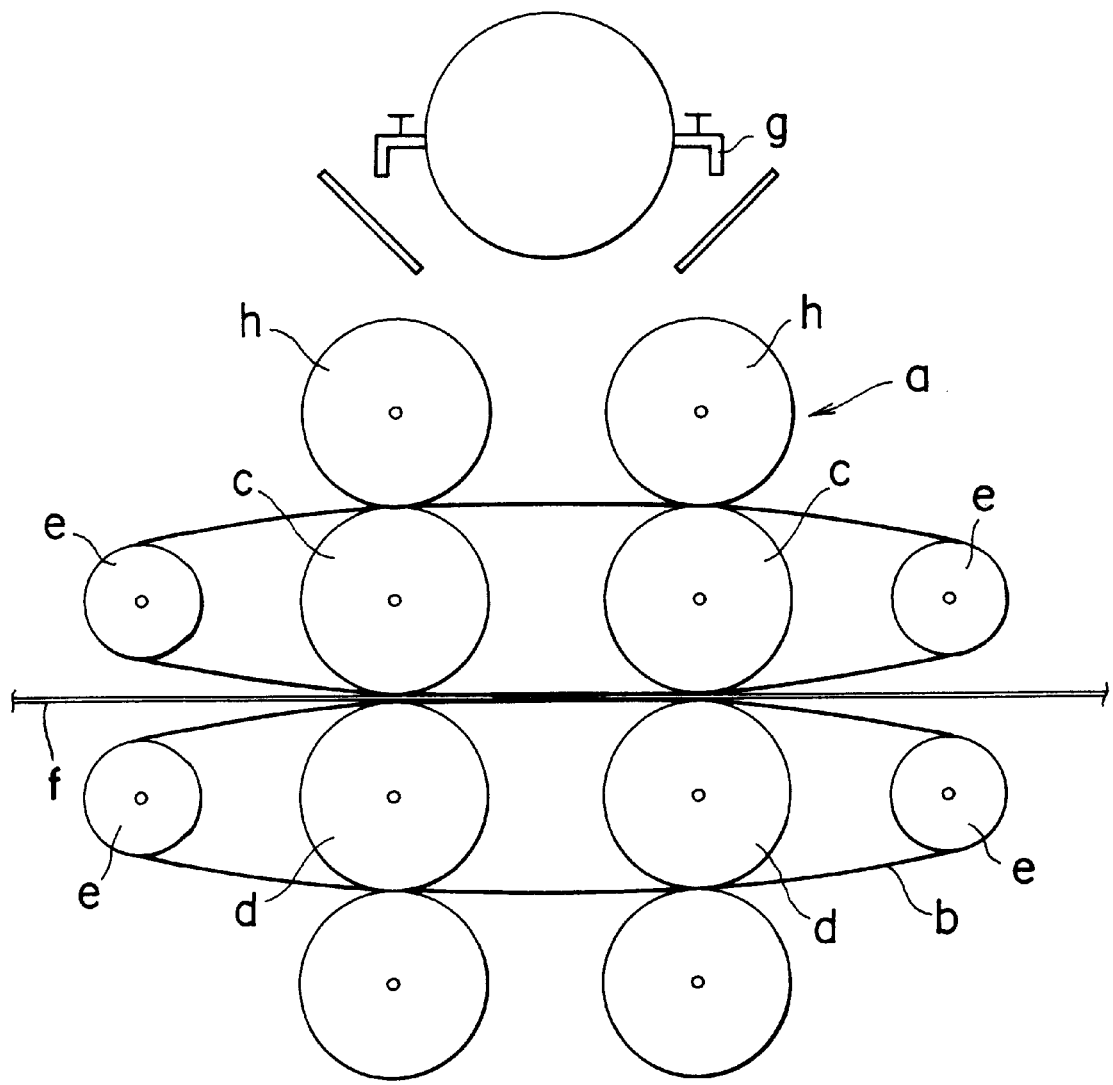
FIG. 7 is a schematic side view of a conventional device for applying seasoning liquid to dried laver.
Figure 8:
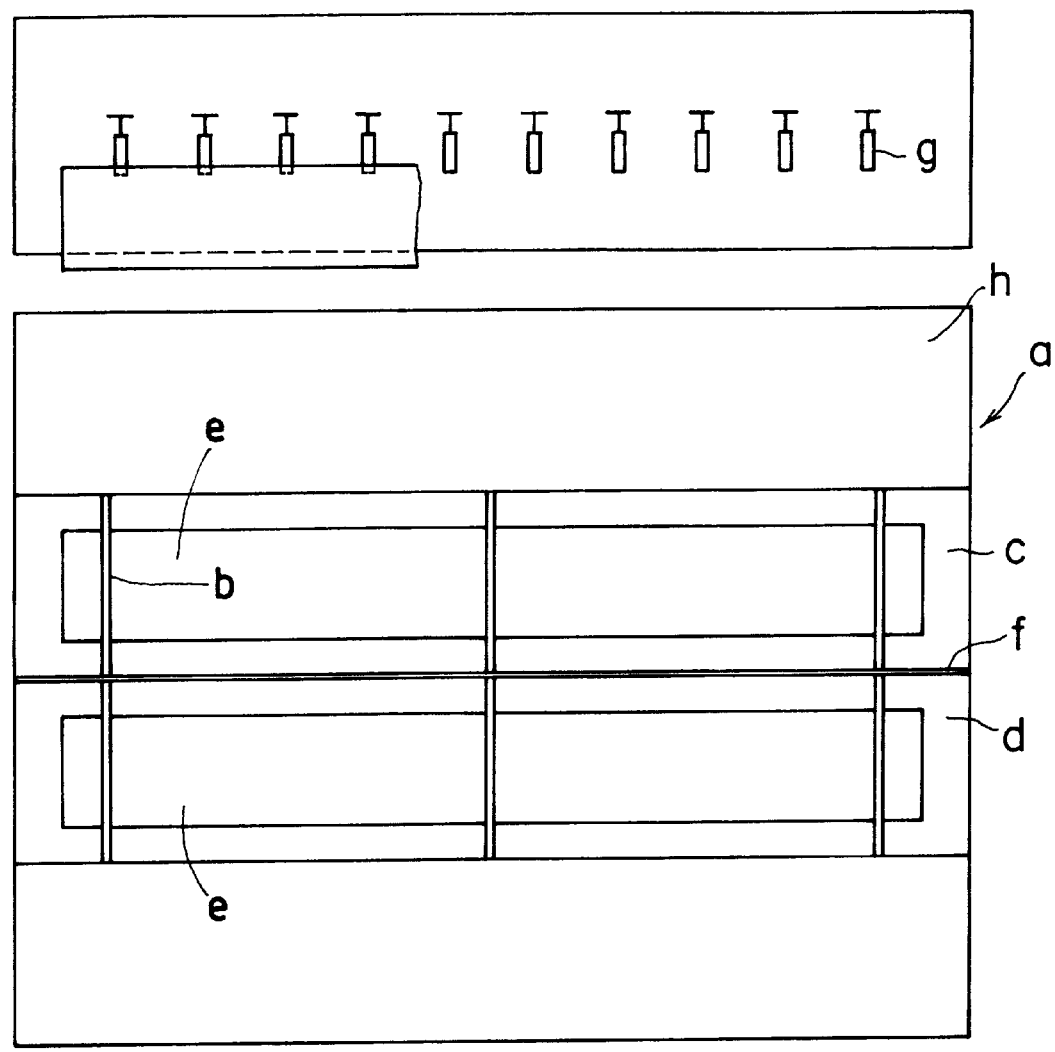
FIG. 8 is a front view of the device for applying seasoning liquid shown in FIG. 7.

The rugged shape formed on the roller surface is not limited to the cylindrical shape and braided thread shape as described in the above embodiments. For example, as shown in FIGS. 5 and 6, rugged shapes such that patterns of square shape 19 or triangular shape 20 are formed on both the surfaces of the dried laver 4 can be used.

As described above, the method for applying seasoning liquid to seasoned laver in accordance with the present invention achieves the following effects:

(1) Even when a solid matter is contained in seasoning liquid, the solid matter does not accumulate on the surface of roller, so that the seasoning liquid can be applied to dried laver satisfactorily.

(2) Even when the viscosity of seasoning liquid is increased or when the supply amount thereof is increased, dried laver is not wound around the roller.

(3) Since the rollers are highly hydrophobic, seasoning liquid does not soak in the rollers. Therefore, the rollers can be cleaned thoroughly, which is good for health.

(4) By controlling the area of convex or concave surface through which seasoning liquid is applied to dried laver, the taste does not become too strong, proper taste being provided.

(5) Since a strong seasoning liquid can be used, the number of kinds of applicable seasoning liquids increases, and the time for drying the seasoned laver can be shortened.

(6) The device is more durable than the conventional device for applying seasoning liquid using sponge rollers.

(7) Since the application area of seasoning liquid is smaller than that for the conventional seasoned laver, a trouble of seasoned laver becoming entangled with a cutting edge when the seasoned laver is cut can be lessened.

We claim:

1. A method for applying seasoning liquid to dried laver, comprising applying a seasoning liquid to a rugged surface of a roller, and contacting said dried laver with said roller, whereby the seasoning liquid adhered on said rugged surface is applied to the dried laver as a discontinuous or patterned seasoning liquid layer.

2. A method according to claim 1, wherein said roller is hydrophobic, which does not absorb the seasoning liquid.

3. The method according to claim 1, wherein the rugged surface has a concave portion and a convex portion, and the seasoning is applied on the concave portion of the rugged surface.

4. The method according to claim 1 wherein the rugged surface is constituted by winding linear objects around the roller.

5. A method according to claim 4, wherein said linear objects are hydrophobic, which do not absorb the seasoning liquid.

6. The method according to claim 1, wherein the rugged surface has a concave portion and a convex portion, and the seasoning liquid is applied on a convex portion of the rugged surface of the roller.

* * * * *